(12) United States Patent
Owings (10) Patent No.: US 6,239,799 B1
(45) Date of Patent: May 29, 2001

(54) METHOD AND SYSTEM FOR PROVIDING A SPLITTER BAR CONTROL

(75) Inventor: Brian Joseph Owings, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/103,036

(22) Filed: Jun. 23, 1998

(51) Int. Cl.⁷ ....................................................... G06F 9/00
(52) U.S. Cl. .......................... 345/340; 345/343; 345/333
(58) Field of Search .................................. 345/340, 341, 345/342, 334, 333, 346, 356; 707/505, 517, 506

(56) References Cited

U.S. PATENT DOCUMENTS

| | | | |
|---|---|---|---|
| 5,001,697 | * | 3/1991 | Torres ................................... 364/521 |
| 5,559,946 | * | 9/1996 | Porter .................................... 395/157 |
| 5,714,971 | * | 2/1998 | Shalit et al. ........................... 345/119 |
| 5,721,852 | * | 2/1998 | Porter .................................... 345/349 |
| 5,883,623 | * | 3/1999 | Cseri ..................................... 345/335 |
| 5,977,973 | * | 11/1999 | Sobeski et al. ....................... 345/342 |

OTHER PUBLICATIONS

Gavron, Jacquelyn and Moran, Joseph, How to Use Microsoft Windows NT Workstation, Ziff David Press, pp. 35 and 162–163, 1996.*

"ActiveThreed: Because Looks are Everything, " *Windows Sources,* vol. 5, May 1997.

"Sheridan Ships ActiveX Controls Wed & Windows, " *Newsbytes,* Jan. 21, 1997.

* cited by examiner

*Primary Examiner*—Raymond J. Bayerl
*Assistant Examiner*—Cao H. Nguyen
(74) *Attorney, Agent, or Firm*—Sawyer Law Group LLP; Prentiss W. Johnson (57) ABSTRACT

A system and method for allowing a developer to lay out a window on a display in a computer system is disclosed. The method and system include providing at least one splitter bar control for at least one splitter bar and allowing the portion of the plurality of controls to be associated with the at least one splitter bar control. The at least one splitter bar control is for controlling at least a portion of the plurality of controls placed in the window when the at least one splitter bar is moved. The at least one splitter bar control is a peer control of the at least the portion of the plurality of controls.

19 Claims, 5 Drawing Sheets

METHOD AND SYSTEM FOR PROVIDING A SPLITTER BAR CONTROL

FIELD OF THE INVENTION

The present invention relates to user interfaces and more particularly to a method and system for providing a splitter bar control which provides more flexibility and does not require special logic.

BACKGROUND OF THE INVENTION

A window that an end user sees is typically developed in a multi-step process. A window is first laid out by a developer. The corresponding code is then generated. This corresponding code creates the window provided to the end user.

A window typically contains controls. The controls include input fields, labels, drop down lists, buttons, and other items that an end user may see in a window. Some of these controls are containers. Containers are controls which can contain other controls. Thus, a window typically includes a hierarchy of controls, with containers containing other controls.

A developer typically lays out the window by utilizing a conventional form designer. The form designer is a tool used to allow a developer to graphically lay out the controls in the window. A form designer is also known as a dialog editor or a form editor. Once the window is laid out, the corresponding code is generated. Typically, the corresponding code includes code automatically generated in response to particular controls and code added by a programmer. The window is created by the corresponding code. The window can then be presented to an end user.

One type of window that is desired to be presented to an end user is a window divided by a splitter bar. Typically, a developer uses conventional control known as a splitter pane control to lay out a window divided by a splitter bar. The splitter pane control includes two containers, known as panes, and a conventional splitter bar between the two panes. The conventional splitter bar typically separates the panes either vertically, between a left pane and a right pane, or horizontally, between an upper pane and a lower pane. When the window is created, an end user is typically allowed to move the conventional splitter bar right-left or up-down, depending on the orientation of the conventional splitter bar. In response to movement of the conventional splitter bar, each pane is automatically resized.

Although the splitter pane control allows for the creation of a window divided by a splitter bar, form designers are usually designed to handle simple controls which are not containers for other controls. Because the splitter pane control includes two containers, conventional form designers are not meant to handle the splitter pane control. Consequently, conventional form designers typically require special logic in order to allow a developer to graphically lay out a window containing the splitter pane control. Without this logic, the conventional splitter bar and the controls within each pane cannot be laid out graphically. Moreover, the splitter pane control typically allows a developer to place only one other control within each of the panes. If another control is desired to be placed within a pane, the developer places the control within a container. As a result, the positioning of the controls is limited.

When a window divided by a splitter bar formed with a splitter pane control is created using Java, an additional problem appears. Typically a cursor appears on screen as a single arrow. When the cursor is moved onto the splitter bar separating the panes, the cursor appears as a double arrow. The double arrow indicates that the splitter bar can be moved to change the size of each pane. However, when the cursor is moved off of the splitter bar to one of the panes, the cursor remains a double arrow. This problem is remedied in Java by setting the cursor explicitly in each pane. However, this requires additional development time and effort.

Accordingly, what is needed is a system and method for providing a window divided by a splitter bar which is more flexible and may not require additional logic. The present invention addresses such a need.

SUMMARY OF THE INVENTION

The present invention provides a method and system for allowing a developer to lay out a window divided by at least one splitter bar on a display in a computer system. The method and system comprise providing at least one splitter bar control for the at least one splitter bar and allowing the portion of the plurality of controls to be associated with the at least one splitter bar control. The at least one splitter bar control is for controlling at least a portion of the plurality of controls placed in the window when the splitter bar is moved. The at least one splitter bar control is a peer control of the at least the portion of the plurality of controls.

According to the system and method disclosed herein, the present invention provides a system and method for providing a window divided by a splitter bar which is more flexible and may not require additional logic.

DETAILED DESCRIPTION OF THE INVENTION

The present invention relates to an improvement in user interfaces. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
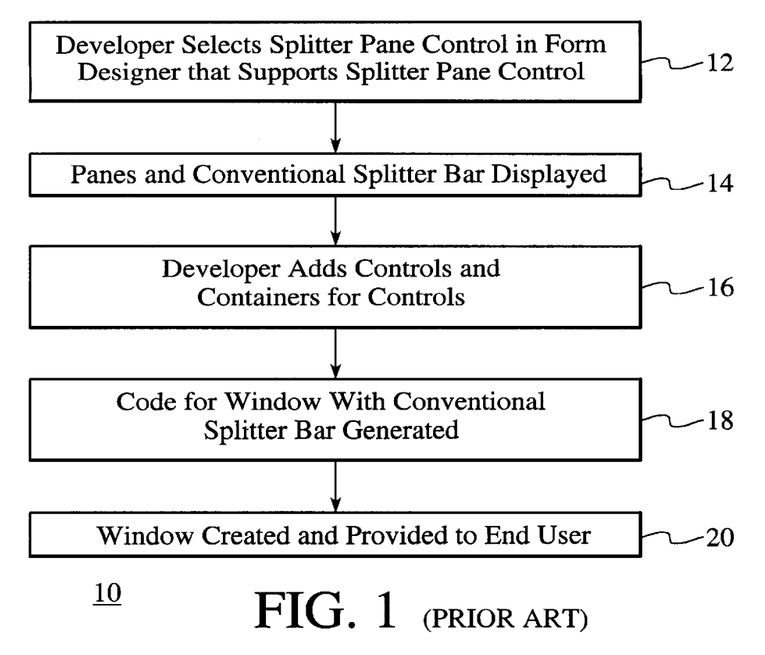
FIG. 1 is a flow chart depicting a conventional method for providing a window divided by a splitter bar.

FIG. 1 depicts a conventional method 10 for using a form designer to generate a window having a conventional splitter pane control. A developer selects the splitter pane control via step 12. The form designer used, therefore, is capable of supporting the conventional splitter pane control. The panes and conventional splitter bar are then displayed via step 14. The developer may then place a control within each of the panes, via step 16. The code for the window is then provided, via step 18. A portion of the code may be automatically generated, while another portion of the code may be added by a programmer. The window is then created from the code, via step 20.

Figure 2:
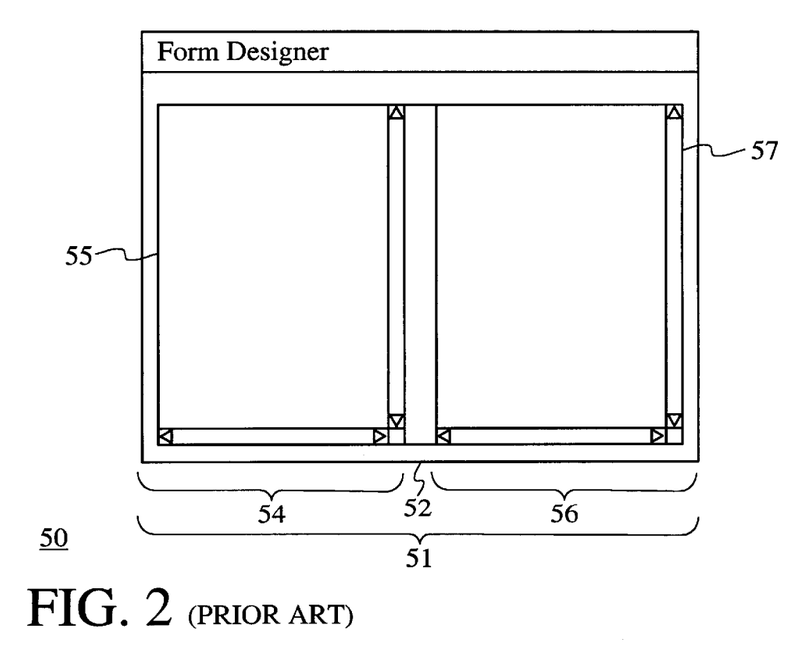
FIG. 2 is a block diagram of a conventional form designer in which a splitter pane control is selected.

FIG. 2 is a block diagram of conventional form designer 50 in which a conventional splitter pane control is used. The conventional form designer 50 allows a user to graphically lay out the window 51. Because a splitter pane control is used, the window 51 has a first pane 54 and a second pane 56. Each pane 54 and 56 is a container. The panes 54 and 56 are separated by a conventional splitter bar 52. The conventional splitter bar 52 extends through the entire window 51. Each pane 54 and 56 contains a text area control 55 and 57, respectively. Each text area control 55 and 57 includes vertical and horizontal scroll bars.

Each of the panes 54 and 56 is a container. Thus, each of the panes 54 and 56 is a control which can contain another control. As shown in FIG. 2, each pane 54 and 56 contains a single text area control 55 and 57, respectively. Typically, the splitter pane control is a parent control of the panes 54 and 56. When the window 51 is presented to the end user, the end user is typically allowed to move the conventional splitter bar 52 right-left. If the conventional splitter bar 52 was horizontal rather than vertical, then the end user would be allowed to move the conventional splitter bar up or down. In response to movement of the conventional splitter bar 52, each pane 54 and 56 is automatically resized.

Although the splitter pane control allows for the creation of the window 51 divided by the splitter bar 52, one of ordinary skill in the art will readily realize that there are several problems associated with the conventional splitter pane control. Form designers 50 are usually designed to handle simple controls which are not containers for other controls. The splitter pane control includes two containers, the first and second panes 54 and 56, respectively. Conventional form designers are not meant to handle the splitter pane control. Consequently, the conventional form designer 50 typically requires special logic in order to allow a developer to use the splitter pane control. Without this logic, the conventional splitter bar 52 and the controls within each pane 54 and 56 cannot be laid out graphically.

One of ordinary skill in the art will recognize that the splitter pane control also limits the flexibility provided to a developer laying out the window 51. The splitter pane control typically allows a developer to place only one other control within each of the panes 52 and 54. As a result, each pane 54 and 56 contains a single text area control 55 and 57, respectively. If another control (not shown) is desired to be placed within a pane 52 or 54, the developer places the control within a container and places the container within a pane 52 or 54. In addition, the conventional splitter bar 52 generated by the splitter pane control extends across the window 51. As shown, the conventional splitter bar 52 reaches from the top edge of the window 51 to the bottom edge. If the splitter bar 52 was horizontal, then the conventional splitter bar 52 would extend from the right edge to the left edge of the window 51. Consequently, each control somehow placed in the window 51 is placed in one of the panes 52 or 54. Once the control is placed within one of the panes 52 or 54 and, if multiple controls are used, in a container within one of the panes 52 or 54, the controls can be automatically resized as the conventional splitter bar 52 is moved by the end user. As a result, the positioning of the controls within the window 51 is limited.

One of ordinary skill in the art will also realize that an additional problem occurs when the window 51 is created using Java. In Java, controls in the hierarchy are considered to be parents of those controls lower in the hierarchy. Similarly, controls deeper in the hierarchy are considered to be children of the controls higher up. The panes 54 and 56 are containers (controls) for the splitter pane control. Thus, in Java, the panes 54 and 56 are considered the children of the splitter pane control signified by the conventional splitter bar 52.

Typically a cursor (not shown) appears on screen as a single arrow. When the cursor is moved onto the conventional splitter bar 52 separating the panes 54 and 56, the cursor appears as a double arrow. This is because the cursor for the splitter bar control is the double arrow. The double arrow is used to indicate to the end user that the conventional splitter bar 52 can be moved. However, in Java, a child inherits the cursor of the parent control. When the cursor is moved off of the conventional splitter bar 52 to one of the panes 54 or 56, the cursor remains a double arrow because the panes 54 and 56 are considered to be children of the splitter pane control. A developer can force the cursor to return to a single arrow by setting the cursor explicitly in each pane 54 and 56. However, this requires additional development time and effort.

The present invention provides for a method and system for providing a window divided by a splitter bar. The present invention will be described in terms of a single splitter bar being provided in a window. The present invention will also be described in terms of a particular language. However, one of ordinary skill in the art will readily recognize that this method and system will operate effectively for other languages, other types of development environments and other numbers of splitter bars.

The present invention provides a method and system for allowing a developer to lay out a window divided by at least one splitter bar on a display in a computer system. The method and system comprise providing at least one splitter bar control for the at least one splitter bar and allowing a portion of the plurality of controls to be associated with the at least one splitter bar control. The at least one splitter bar control is for controlling at least a portion of the plurality of controls placed in the window when the splitter bar is moved. In one embodiment, this includes resizing at least the portion of the plurality of controls when the splitter bar is moved. The at least one splitter bar control is a peer control of the at least the portion of the plurality of controls.

Figure 3:
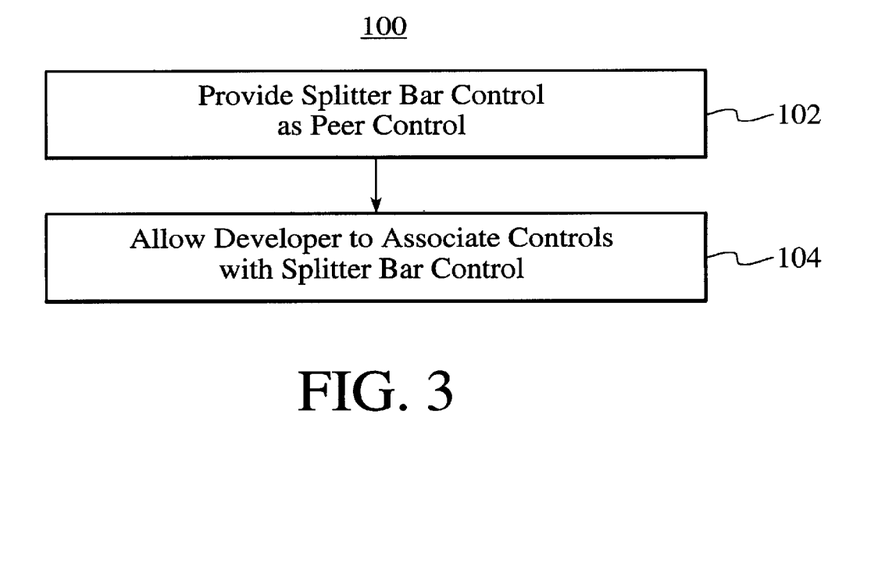
FIG. 3 is a flow chart of a method for allowing development of a window divided by a splitter bar in accordance with the present invention.

To more particularly illustrate the method and system in accordance with the present invention, refer now to FIG. 3 depicting a flow chart of one embodiment of such a method 100 for method for allowing development of a window divided by a splitter bar in accordance with the present invention. A peer control called a splitter bar control is provided via step 102. A developer, such as a programmer, is also allowed to associate other controls with the splitter bar control, via step 104. The splitter bar control will control associated controls. For example, the splitter bar control may resize associated controls when a splitter bar generated by the splitter bar control is moved by an end user.

The splitter bar control is a peer control because it is similar to other controls on which the splitter bar control operates. Thus, the splitter bar control is simply another control. It does not require separate containers, such as panes 54 and 56 of the splitter pane control. Because the splitter bar control is a peer control, containers need not be provided for other controls which the developer wishes to place in the window. In addition, because the splitter bar control is a peer control, special logic may not be required in order to implement the splitter bar control in a form designer. Preferably, the splitter bar control is implemented in Java. Because the splitter bar control is a peer control, the cursor for the splitter bar control is not passed to another portion of the window even when implemented in Java. Note, however, that nothing prevents the splitter bar control from being implemented in another language.

Figure 4:
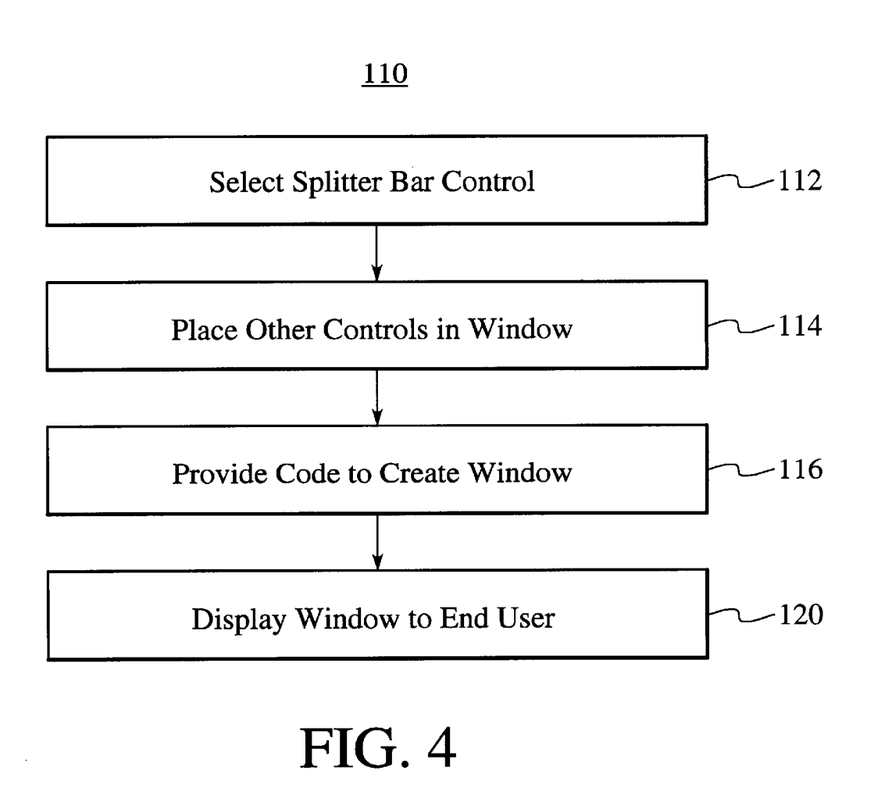
FIG. 4 is a flow chart depicting a method for providing a window divided by a splitter bar in accordance with the present invention.

FIG. 4 is a flow chart depicting one embodiment of a method 110 for providing a window divided by a splitter bar in accordance with the present invention. A developer selects the splitter bar control, via step 112. In one embodiment, the developer selects the splitter bar control in a form designer by selecting a splitter bar to separate areas of a window. As discussed above, special logic may not be needed to provide the splitter bar control in such a form designer. The developer may then place other controls within the window, via step 114. At least a portion of these other controls are to be controlled by the splitter bar control. The code for creating the window is then provided, via step 116. The code creates and displays the window to the end user, via step 120.

Figure 5:
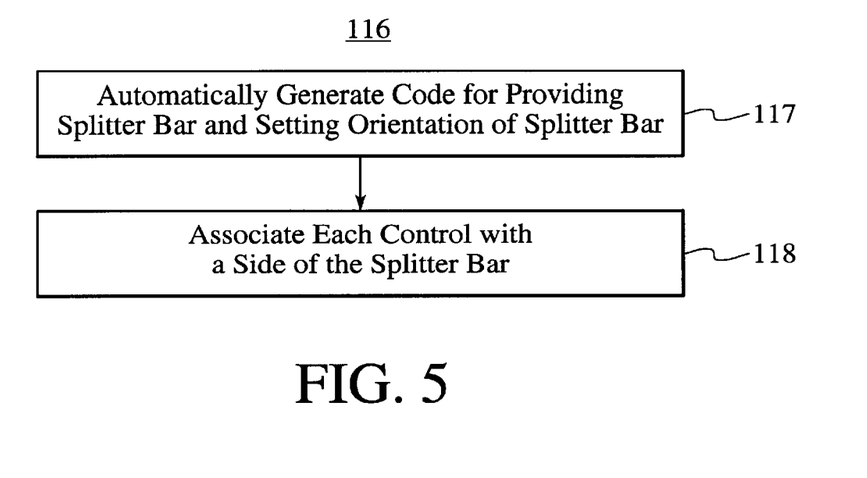
FIG. 5 is a flow chart depicting a method for providing code to create a window in accordance with the present invention.

FIG. 5 is a flow chart depicting one embodiment of step 116, providing code to create a window, in accordance with the present invention. Some code for the splitter bar may be automatically generated via step 117. In a preferred embodiment, the code generated in step 117 provides the splitter bar and sets the orientation of the splitter bar. Preferably, a command having a single argument determines the orientation of the splitter bar. If the argument is a one, the orientation of the splitter bar is vertical. If the argument is a zero, the orientation of the splitter bar is horizontal. Also in a preferred embodiment, the code generated in step 117 also sets the bounds of the splitter bar. Consequently, the splitter bar need not extend from one edge of the window to another.

A developer may then add additional code via step 118. In a preferred embodiment, the additional code added by the developer associates controls placed in the window with the splitter bar control. Also in a preferred embodiment, the code added by the developer associates the splitter bar control with controls in the window. Thus, the controls within the window which are to be operated on by the splitter bar control can be selected by the developer. In addition, the side of the splitter bar to which the controls are associated are preferably determined in step 118. For example, if a vertical splitter bar is selected, then via step 118, a developer preferably associates each control with the right or the left of the splitter bar. If a horizontal splitter bar is selected, then via step 118, a developer preferably associates each control with the top or the bottom of the splitter bar. The splitter bar control preferably resizes the associated control depending on which side of the splitter bar the control is associated.

Figure 6:
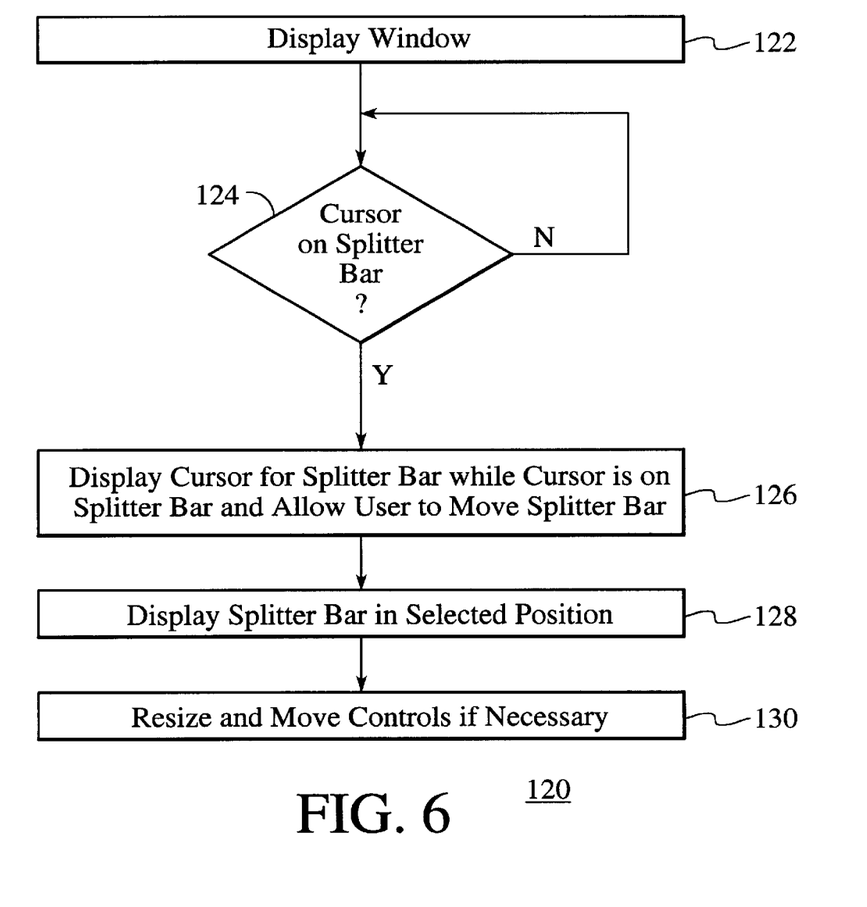
FIG. 6 is a flow chart depicting a method for displaying the window divided by a splitter bar in accordance with the present invention.

FIG. 6 is a flow chart depicting one embodiment of step 120, displaying the window divided by a splitter bar, in accordance with the present invention. The window is displayed to the end user via step 122. It is then determined if the end user has placed a cursor (not shown) on the splitter bar, via step 124. If so, then the cursor is replaced with a cursor corresponding to the splitter bar control and the end user is allowed to move the splitter bar, via step 126. Preferably, the corresponding cursor is a double arrow. The end user is preferably allowed to move the splitter bar by selecting the splitter bar and dragging the splitter bar. The splitter bar is displayed at the appropriate position via step 128. Thus, if the end user moves the splitter bar, then the splitter bar is moved to the appropriate position in step 128. The controls associated with the splitter bar control are then resized if necessary, moved if necessary, and displayed, via step 130.

Figure 7:
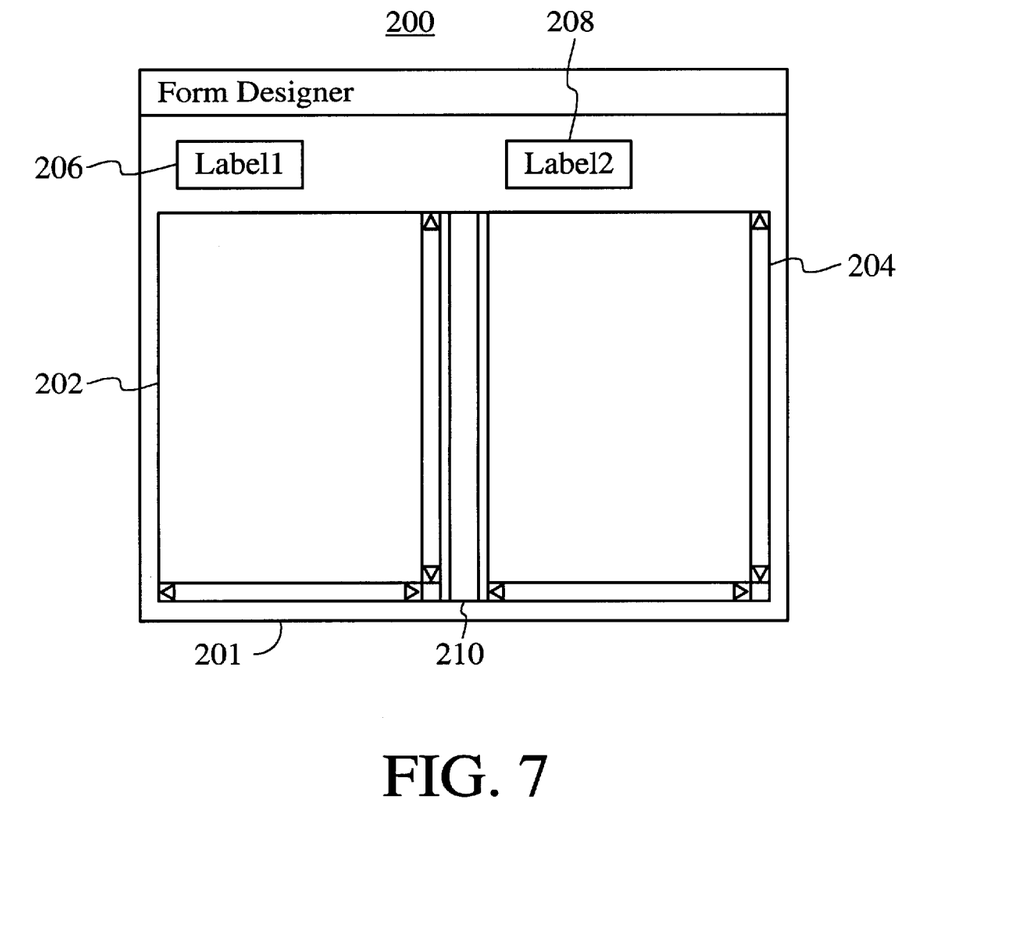
FIG. 7 is a block diagram of a form designer in which a splitter bar control for a vertical splitter bar is selected in accordance with the present invention.

FIG. 7 is a block diagram of a form designer 200 in which a splitter bar control for a vertical splitter bar is selected in accordance with the present invention. The form designer 200 depicts a window 201. The window 201 includes a vertical splitter bar 210 corresponding to the splitter bar control. The window 201 also includes four controls. The four controls are text area1 202, text area2 204, Label1 206, and Label2 208. The boundaries of the splitter bar 210 have been set so that the splitter bar 210 does not extend from the bottom edge to the top edge of the window 202. Text area1 202 and Label1 206 are on a first side of the splitter bar 210. Text area2 204 and Label2 208 are on a second side of the splitter bar 210. Preferably, the text area1 202 and Label1 206 are associated with the first side of the splitter bar 210. Text area2 204 and Label2 208 are associated with the second side of the splitter bar 210.

Figure 8A:
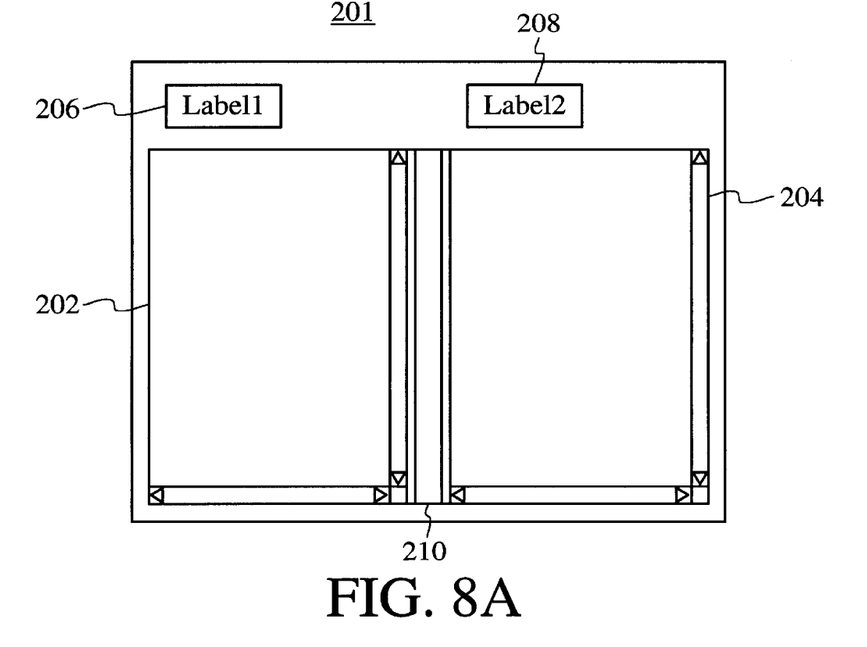
FIG. 8A is a block diagram of a window having a vertical splitter bar in accordance with the present invention.
Figure 8B:
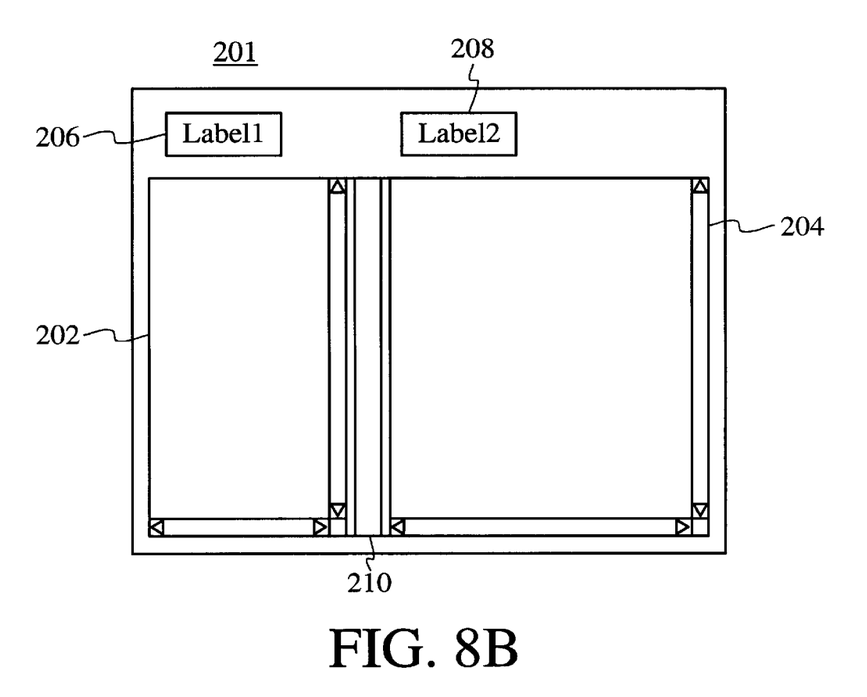
FIG. 8B is a block diagram of a window having a vertical splitter bar in accordance with the present invention.

FIG. 8A is a block diagram 230 of a window 201 that has been formed using form designer 200 and the method 110. The window 201 includes the vertical splitter bar 210, text area1 202, Label1 206, text area2 204, and Label2 208. FIG. 8B is a block diagram 240 of the window 201 when the vertical splitter bar 210 has been moved to the right by the end user. Because the text area1 202 and Label1 206 are associated with the first side of the splitter bar 210, the text area1 202 and Label1 206 are shrunk because the splitter bar 210 has been moved right. Because the text area2 204 and Label2 208 are associated with the second side of the splitter bar 210, the text area1 202 and Label1 206 are enlarged because the splitter bar 210 has been moved right.

As discussed previously, the splitter bar control is a peer control. The spitter bar control preferably does not contain any other controls. Thus, the double arrow cursor (not shown) which appears when the end user places cursor on the splitter bar 210 may revert to another default cursor when moved off of splitter bar 210. It is not necessary to specify a cursor for different sections of the window 201. In addition, separate panes are preferably not used. Instead, the splitter bar control can simply operate on controls which are associated with it. As a result, the layout of the window 201 becomes more flexible. The associated controls can be placed anywhere within the window 201. The splitter bar control may then move or resize the controls based on the side of splitter bar 210 with which the controls are associated. Moreover, special logic may not be required in order to implement the splitter bar control. This is because the splitter bar control need not be a container.

Thus, the splitter bar control makes layout simpler for a developer using a conventional form designer having no special logic. Due in part to the flexibility discussed above, the layout desired by the developer can be achieved more easily. In addition, the flexibility of the layout is further improved by allowing the boundaries of the splitter bar control to be specified. As a result, the splitter bar 210 need not completely divide the window 201 in which the splitter bar 210 is placed. Instead, as depicted in FIGS. 8A and 8B, space around the splitter bar 210 may be left in the window 201. Controls need not be placed on one side or the other of the splitter bar 210 in order for the splitter bar control to correctly operate on the control. For example, in FIG. 8A, Label1 204 and Label2 208 are not directly to one side or the other of the splitter bar 210. Instead, Label1 204 and Label2 208 are slightly above the splitter bar 210. However, because the splitter bar control operates on associated controls and because the Label1 204 and the Label2 208 are associated with the splitter bar control, the splitter bar control resizes Label1 204 and Label2 208, as shown in FIG. 8B.

A method and system has been disclosed for providing a window divided by a splitter bar. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for allowing a developer to lay out a window divided by at least one splitter bar on a display in a computer system, the window capable of including a plurality of controls placed in the window, the method comprising the steps of:

(a) providing at least one splitter bar control for the at least one splitter bar, the at least one splitter bar control for controlling at least a portion of the plurality of controls placed in the window when the at least one splitter bar is moved, the at least one splitter bar control being a peer control of the at least the portion of the plurality of controls;

(b) allowing the portion of the plurality of controls to be associated with the at least one splitter bar control such that the portion of the plurality of controls are moved, resized or both in response to a movement of the at least one splitter bar.

2. The method of claim 1 wherein the at least one splitter bar has a first side and a second side, the associating step (b) further comprising the step of:

(b1) allowing each control of at least the portion of the plurality of controls to be associated with either the first side or the second side of the at least one splitter bar.

3. The method of claim 2 wherein a control of the at least the portion of the plurality of controls is controlled based on whether the control is associated with the first side of the at least one splitter bar or is associated with the second side of the at least one splitter bar.

4. The method of claim 1 wherein the at least one splitter bar control can be provided in step (a) and the portion of the plurality of controls can be associated in step (b) without requiring the use of at least one container for the portion of the plurality of controls and the at least one splitter bar control.

5. A method for providing a window divided by at least one splitter bar on a display in a computer system, the window capable of including a plurality of controls placed in the window, the method comprising the steps of:

(a) selecting at least one splitter bar control for the at least one splitter bar, the at least one splitter bar control for controlling at least a portion of the plurality of controls placed in the window when the at least one splitter bar is moved, the at least one splitter bar control being a peer control of the at least the portion of the plurality of controls, the portion of the plurality of controls being associated with the at least one splitter bar control such that the portion of the plurality of controls are moved, resized or both in response to a movement of the at least one splitter bar;

(b) providing code to create the window including the at least one splitter bar and the plurality of controls;

(c) displaying the window.

6. The method of claim 5 wherein code providing step (b) further includes the step of:

(b1) allowing the portion of the plurality of controls to be associated with the at least one splitter bar control.

7. The method of claim 6 wherein the at least one splitter bar has a first side and a second side, the associating step (b1) further comprising the step of:

b1i) allowing each control of at least the portion of the plurality of controls to be associated with either the first side or the second side of the at least one splitter bar.

8. The method of claim 7 wherein window displaying step (c) further includes the step of:

(c1) resizing the at least the portion of the plurality of controls when the at least one splitter bar is moved, a control of the portion of the at least the portion of the plurality of controls being resized based on whether the control is associated with the first side of the at least one splitter bar or is associated with the second side of the at least one splitter bar.

9. The method of claim 8 wherein the window has a height and wherein the at least one splitter bar extends the height of the window.

10. The method of claim 8 wherein the window has a width and wherein the at least one splitter bar extends the width of the window.

11. The method of claim 5 wherein the at least one splitter bar control and the portion of the plurality of controls can be implemented without requiring the use of at least one container for the portion of the plurality of controls and the at least one splitter bar control.

12. A system for allowing a developer to lay out a window divided by at least one splitter bar on a display in a computer system, the window capable of including a plurality of controls placed in the window, the system comprising:

at least one splitter bar control for the at least one splitter bar, the at least one splitter bar control for controlling at least a portion of the plurality of controls placed in the window when the at least one splitter bar is moved, the at least one splitter bar control being a peer control of the at least the portion of the plurality of controls, the portion of the plurality of controls being associated with the at least one splitter bar control such that the portion of the plurality of controls are moved, resized or both in response to a movement of the at least one splitter bar.

13. The system of claim 12 wherein the at least one splitter bar has a first side and a second side, and wherein each control of the at least the portion of the plurality of controls either is associated with the first side of the at least one splitter bar or is associated with the second side of the at least one splitter bar.

14. The system of claim 13 wherein the each control of the at least the portion of the plurality of controls is controlled based on whether the control is associated with the first side of the at least one splitter bar or is associated with the second side of the at least one splitter bar.

15. The system of claim 12 wherein the at least one splitter bar control and the portion of the plurality of controls do not require the use of at least one container for the portion of the plurality of controls and the at least one splitter bar control.

16. A computer-readable medium containing a program for allowing a developer to lay out a window divided by at least one splitter bar on a display in a computer system, the window capable of including a plurality of controls placed in the window, the program containing instructions for:

(a) providing at least one splitter bar control for the at least one splitter bar, the at least one splitter bar control for controlling at least a portion of the plurality of controls placed in the window when the at least one splitter bar is moved, the at least one splitter bar control being a peer control of the at least the portion of the plurality of controls; and (b) associating that at least the portion of the plurality of controls with the at least one splitter bar control such that the portion of the plurality of controls are moved, resized or both in response to a movement of the at least one splitter bar.

17. The computer-readable medium of claim 16 wherein the at least one splitter bar has a first side and a second side, and wherein each control of the at least the portion of the plurality of controls either is associated with the first side of the at least one splitter bar or is associated with the second side of the at least one splitter bar.

18. The computer-readable medium of claim 17 wherein each control of the at least the portion of the plurality of controls is controlled based on whether the control is associated with the first side of the at least one splitter bar or is associated with the second side of the at least one splitter bar.

19. The computer-readable medium of claim 16 wherein the at least one splitter bar control can be provided in instructions (a) and the portion of the plurality of controls can be associated in instructions (b) without requiring the use of at least one container for the portion of the plurality of controls and the at least one splitter bar control.

\* \* \* \* \*